(12) United States Patent
Cobb

(10) Patent No.: US 8,658,044 B2
(45) Date of Patent: Feb. 25, 2014

(54) STORMWATER FILTRATION APPARATUS, SYSTEM AND METHOD

(75) Inventor: Daniel P. Cobb, Gray, ME (US)

(73) Assignee: Contech Engineered Solutions LLC, West Chester, OH (US)

( * ) Notice: Subject to any disclaimer, the term of this patent is extended or adjusted under 35 U.S.C. 154(b) by 771 days.

(21) Appl. No.: 12/877,696

(22) Filed: Sep. 8, 2010

(65) Prior Publication Data

US 2011/0056890 A1    Mar. 10, 2011

Related U.S. Application Data

(60) Provisional application No. 61/240,808, filed on Sep. 9, 2009.

(51) Int. Cl.
*C02F 1/00* (2006.01)
*B01D 35/00* (2006.01)
*B01D 29/00* (2006.01)

(52) U.S. Cl.
USPC ........ 210/747.3; 210/406; 210/437; 210/475; 210/739; 210/747.6; 210/747.2

(58) Field of Classification Search
USPC ........... 210/406, 437, 475, 739, 747.3, 747.2, 210/747.6
See application file for complete search history.

(56) References Cited

U.S. PATENT DOCUMENTS

| | | |
|---|---|---|
| 3,298,523 A | 1/1967 | Johnson |
| 3,534,855 A | 10/1970 | Guillerd et al. |
| 3,623,978 A | 11/1971 | Boze et al. |
| 3,724,665 A | 4/1973 | Hall |
| 3,820,658 A | 6/1974 | Cruze, Jr. |
| 3,948,773 A | 4/1976 | Tucker |
| 3,994,810 A | 11/1976 | Schaeffer |
| 4,036,757 A | 7/1977 | Peasley |
| 4,405,466 A | 9/1983 | Giannelli et al. |
| 4,477,343 A | 10/1984 | Tucker |
| 4,537,687 A | 8/1985 | Piper |
| 4,561,979 A | 12/1985 | Harms et al. |
| 4,592,848 A | 6/1986 | Pabst |
| 4,642,188 A | 2/1987 | DeVisser et al. |
| 4,643,836 A | 2/1987 | Schmid |
| 4,678,564 A | 7/1987 | Moorehead et al. |
| 4,818,420 A | 4/1989 | Mims |
| 5,017,241 A | 5/1991 | Ryan |
| 5,114,596 A | 5/1992 | Laterra |
| 5,151,175 A | 9/1992 | Royal |
| 5,214,020 A | 5/1993 | Shimoda |
| 5,288,399 A | 2/1994 | Schulz |
| 5,322,629 A | 6/1994 | Stewart |
| 5,437,788 A * | 8/1995 | Geibel et al. ............. 210/333.01 |
| 5,464,543 A | 11/1995 | Moore |
| 5,484,536 A | 1/1996 | Yamaguchi et al. |
| 5,624,576 A | 4/1997 | Lenhart et al. |
| 5,707,527 A | 1/1998 | Knutson et al. |
| 5,720,875 A | 2/1998 | Stegall, Sr. et al. |
| 5,746,911 A | 5/1998 | Pank |
| 5,759,412 A | 6/1998 | McDouglad |
| 5,792,373 A | 8/1998 | Bennick et al. |
| 6,027,639 A | 2/2000 | Lenhart, Jr. et al. |
| 6,110,389 A | 8/2000 | Hotowitz |
| 6,132,626 A | 10/2000 | Hart |
| 6,171,507 B1 | 1/2001 | Roy et al. |
| 6,197,192 B1 | 3/2001 | Smith-Hadon et al. |
| 6,264,835 B1 | 7/2001 | Pank |
| 6,294,098 B1 | 9/2001 | Bergmann |
| 6,368,513 B1 | 4/2002 | Christophe et al. |
| 6,428,690 B1 | 8/2002 | Tse |
| 6,576,146 B2 | 6/2003 | Fry et al. |
| 6,596,158 B1 | 7/2003 | Cowan |
| 6,649,048 B2 | 11/2003 | de Ridder et al. |
| 6,869,528 B2 | 3/2005 | Pank |
| 6,921,481 B2 | 7/2005 | Jessop et al. |
| 7,000,782 B2 | 2/2006 | Walton et al. |
| 7,032,760 B2 | 4/2006 | Walton et al. |
| 7,182,856 B2 | 2/2007 | Pank |
| 7,214,311 B2 * | 5/2007 | Aberle et al. ............ 210/170.03 |

(Continued)

FOREIGN PATENT DOCUMENTS

| | | |
|---|---|---|
| GB | 1388256 | 3/1975 |
| WO | WO US2008/140919 | 11/2008 |

OTHER PUBLICATIONS

PCT, International Search Report and Written Opinion, International Application No. PCT/US2010/047937 (Nov. 17, 2010).
*The Compact Automatic Basket Transpor Machine; Group 2*—On Closest Area High Performance and Economically; MEIKO Maschinenbau GmbH & CO; Nov. 1993; With Translation; 9 pgs.
*Basket Washing Plant; Series ECW;* Hobart Production Group; www.hobart.de; With Translation; 10 pgs.
*Nozzles and Accessories for the Industry,* Gerhard Schulz, Spraying Systems Deutschland GmbH; With Translation; 10 pgs.

(Continued)

*Primary Examiner* — Nam Nguyen
*Assistant Examiner* — Claire Norris
(74) *Attorney, Agent, or Firm* — Thompson Hine LLP

(57) ABSTRACT

A stormwater filter cartridge includes a housing with internal filter medium disposed along a flow path between a water inlet and a filtered water outlet. A solid wall float tube in a drainage space has an open lower end and open upper end and is movable between a lowered position and a raised position. As the housing fills, water level in the housing rises to cause the solid wall float tube to move to the raised position and a negative pressure draws fluid through the filter medium. As water level outside the filter cartridge drops, air enters the housing and causes the solid wall float tube to drop to the lowered position, and filtered water in a fluid reservoir backflows through the filter medium while air enters the housing by passing upward through the solid wall float tube so as to enhance rate of backflow.

18 Claims, 6 Drawing Sheets

(56) References Cited

U.S. PATENT DOCUMENTS

| | | |
|---|---|---|
| 7,638,066 B1 | 12/2009 | Jacob et al. |
| 2002/0117435 A1 | 8/2002 | Pank |
| 2003/0034286 A1 | 2/2003 | Butler |
| 2003/0127377 A1 | 7/2003 | Pank |
| 2003/0196950 A1 | 10/2003 | Kraft |
| 2005/0178719 A1 | 8/2005 | Pank |
| 2007/0023352 A1 | 2/2007 | Pank et al. |
| 2008/0217227 A1 | 9/2008 | Pank |
| 2008/0217238 A1 | 9/2008 | Pank |
| 2008/0217257 A1 | 9/2008 | Pank |
| 2009/0045149 A1* | 2/2009 | Murray et al. ............... 210/785 |

OTHER PUBLICATIONS

Hydro International Stormwater, www.hydro-international.biz/us/stormwater)us/upflo.php, Jul. 21, 2006, 2 pages.

Setting the Standard Technology Driving Design, www.hydrointernational.biz, 2 pages.

The new direction in stormwater filtration::UP, www.hydrointemational.biz, 5 pages.

Baysaver Technologies, Inc.; Bayfilter™ System; *Technical and Design Manual;* Version 1.1; Nov. 2006.

Baysaver Technologies, Inc; *Sand Filter Performance in a Cartridge Based Design—Introducing the all-new BayFilter™ with a flow capacity of 30 GMP;* Jul. 2006.

Prosecution History of U.S.; US 2007/0023352; Feb. 1, 2007.

* cited by examiner

STORMWATER FILTRATION APPARATUS, SYSTEM AND METHOD

CROSS-REFERENCES

The present application claims the benefit of U.S. Provisional Application Ser. No. 61/240,808, filed Sep. 9, 2009, the entirety of which is incorporated herein by reference.

TECHNICAL FIELD

The present application relates generally to a stormwater filtration apparatus and, in particular, a modular stormwater filter assembly having backflow capability.

BACKGROUND

Stormwater is generally rainwater plus any particulate debris and dissolved materials that the rainwater runoff carries along with it. In urban areas, rain that falls on the roofs of buildings, collects on paved areas like driveways, roads, runways and sidewalks is typically diverted through a system of pipes that is separate from the sewerage system.

Stormwater can be a form of diffuse or non-point source pollution. It can entrain pollutants, such as garbage, sediment, organic matter, heavy metals, and organic toxins, and transport them into receiving natural bodies of water. As a consequence, natural bodies of water that receive stormwater may also receive pollutants capable of irreparable environmental harm.

The amount of stormwater pollution entering into such receiving bodies of water is related to the degree of urbanization in the surrounding area and the nature of the surrounding activities. Urbanization results in the covering of land with low/no-permeability structures, such as roadways, parking lots, and rooftops, which both generate large volumes of stormwater and accumulate pollutants. Since these types of surfaces do not allow rainfall to infiltrate, they allow the accumulated pollutants to be carried into stormwater drainage systems.

In an effort to address the environmental problems posed by polluted stormwater, traps and filters for stormwater have been developed. For example, U.S. Pat. No. 5,322,629 describes a method and apparatus for treatment of stormwater by vertical filtration through a bed of high-quality leaf compost material that removes pollutants prior to discharge into a receiving water body.

A granular form of compost that improves the overall performance of such filtration systems was described in U.S. Pat. No. 5,624,576. The permeability of a filter containing such granular compost is increased, and can be maintained for an extended period of time.

The filter apparatus described in U.S. Pat. No. 6,027,639 features a siphon-inducing mechanism. The filter apparatus utilized a sealed upper housing that included a check valve for air evacuation within the housing. An induced siphon effect pulled stormwater through the filter until air was pulled through an air inlet along the lower perimeter of the housing, disrupting the siphon. It was intended that the air stream that resulted from such a siphon-breaking event would produce turbulence and thereby clean the filter.

As use of such filter cartridges becomes more and more common, the desire and need for a cartridge with increased useful life increases, so as to reduce the frequency with which the cartridges might need to be replaced (e.g., with a replacement cartridge) or maintained (e.g., via a service call in which the cartridge media is replaced).

SUMMARY

In one aspect, a stormwater filter cartridge includes a housing having a water inlet and a filtered water outlet, and a filter medium disposed along a flow path between the water inlet and the filtered water outlet. A drainage space forms at least part of the flow path and is disposed between a downstream side of the filter medium and the filtered water outlet. A solid wall float tube disposed in the drainage space has an open lower end and open upper end, the solid wall float tube movable between a lowered position that inhibits or substantially restricts filtered water at the bottom of the drainage space from passing to the filtered water outlet and a raised position that permits free flow of filtered water to the filtered water outlet. A fluid reservoir is in fluid communication with the drainage space and is disposed within the housing and above the filter medium for collecting filtered water as water level in the housing rises while the solid wall float tube is in the lowered position. As the housing fills, water level in the housing rises to cause the solid wall float tube to move to the raised position and a negative pressure can be established in the housing that draws fluid through the filter medium. As water level outside the filter cartridge drops, air enters the housing via the water inlet and causes the solid wall float tube to drop to the lowered position, and filtered water in the fluid reservoir backflows through the filter medium and out of the housing through the water inlet while air enters the housing by passing upward through the solid wall float tube so as to enhance rate of backflow.

In one implementation of the foregoing aspect, the drainage space is centrally located within the housing, the filtered water outlet is at the bottom of the drainage space, and the drainage space is defined at least in part by a tube that surrounds the solid wall float tube and which is perforated along at least a lower section thereof.

In a further implementation of the foregoing aspect or implementation, an upper portion of the perforated tube is not perforated.

In a further implementation of the foregoing aspect or any foregoing implementation, the filter medium may be formed by one or more of a granular filter media, a pelletized filter media, a filter fabric or a filter mesh.

In a further implementation of the foregoing aspect or any foregoing implementation, the fluid reservoir may include an associated check valve for purging air from the fluid reservoir as it fills with filtered water.

In a further implementation of the foregoing aspect or any foregoing implementation, at least one upwardly extending air flow passage may be provided from an upper portion of the fluid reservoir to an upper portion of the drainage space.

In a further implementation of the foregoing aspect or any foregoing implementation, a deflecting structure may be located below the air flow passage in the drainage space.

In a further implementation of the foregoing aspect or any foregoing implementation, a stormwater treatment system includes a plurality of filter cartridges and a containment structure includes an inlet and at least one drain manifold, each filter cartridge within the containment structure having its outlet connected to deliver filtered stormwater to the drain manifold.

In another aspect, a stormwater filter assembly includes a housing including an inlet and an outlet. An inner float tube is located within the housing and has a lower end associated with the outlet, the float tube movable between a lowered position that inhibits or substantially restricts filtered water from passing to the outlet and a raised position that permits flow of filtered water to the outlet, the inner float tube having a flow passage therein from its lower end to its upper end. An outer tube is disposed about the inner float tube defining a flow space therebetween for receiving filtered stormwater. A filter medium is disposed between the inlet and the outer tube through which stormwater travels during a filtering operation, the inner float tube extends upward above a height of the filter medium and the outer tube extends upward above the height of the filter medium. A fluid reservoir is located above the filter media for collecting filtered stormwater as water level in the housing rises while the inner float tube is in the lowered position. During a stormwater filtration event water level in the housing rises to cause the inner float tube to move to the raised position and a negative pressure is established in the housing that draws fluid through the filter medium. As water level outside the filter cartridge drops, air enters the housing and disrupts the reduced pressure condition and causes the inner float tube to drop to the lowered position and filtered water in the fluid reservoir backflows through the filter medium and out of the housing while air enters the housing by passing upward through the inner float tube along the flow passage so as to enhance rate of backflow.

In yet another aspect, a method of filtering stormwater to remove contaminants involves: flowing stormwater into a filter unit; purging air from the filter housing as the filter unit fills with stormwater; providing a float tube within the unit in a lowered position that inhibits filtered stormwater from exiting through an outlet of the filter unit; filling an upper fluid reservoir of the filter unit with filtered stormwater; moving the float tube to a raised position that permits filtered stormwater to exit the outlet and creating a reduced pressure condition that draws stormwater through the filter unit; as water level around the filter housing drops: air enters the filter unit and disrupts the reduced pressure condition and causes the float tube to drop back to the lowered position; and filtered water in the fluid reservoir backflows through the filter unit while air enters the filter unit by passing upward through the float tube so as to enhance rate of backflow.

DETAILED DESCRIPTION

Figure 1:
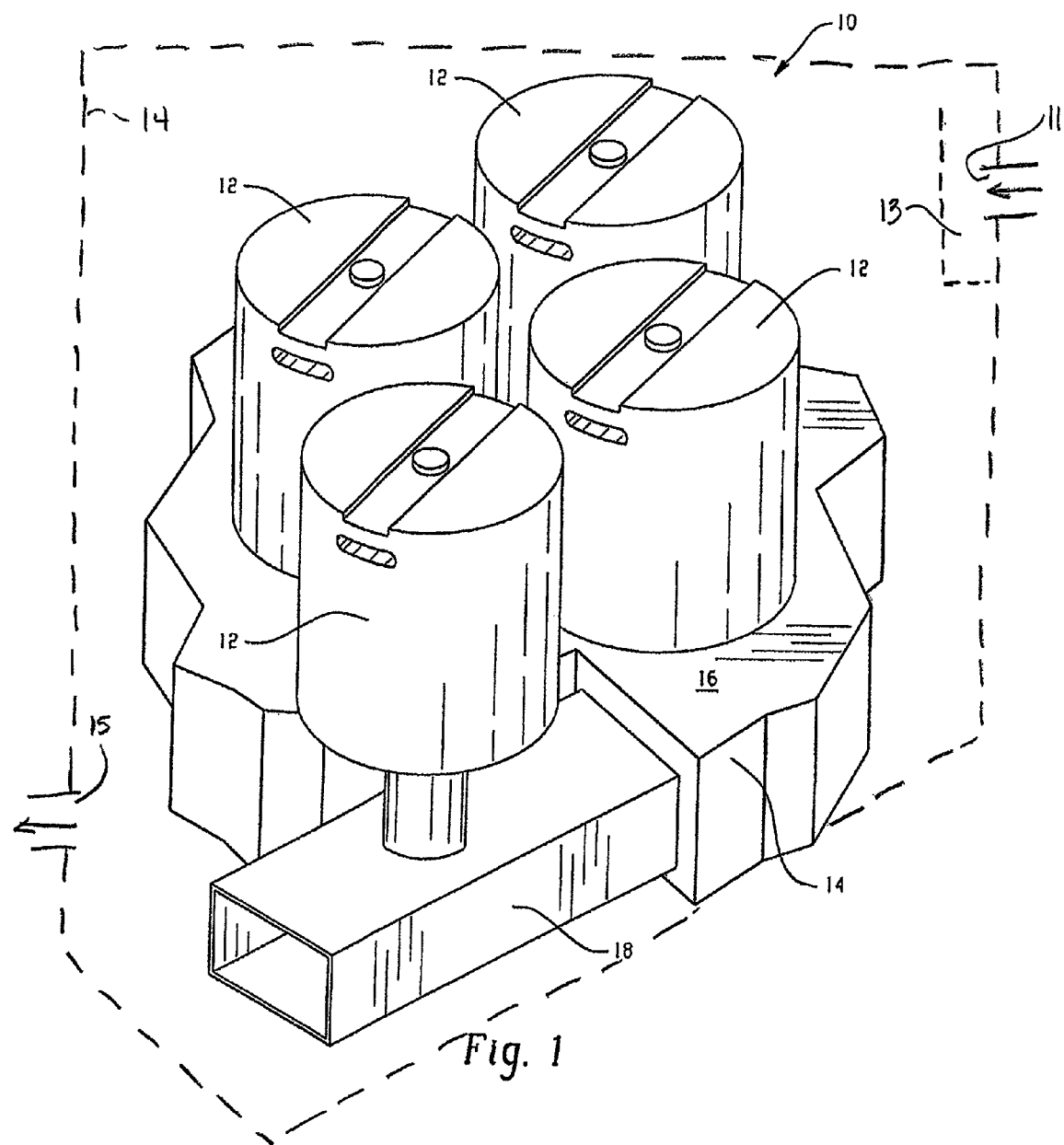
FIG. 1 is a partial perspective of a filter assembly installation.

Referring to FIG. 1, a manifold 10 of filter assemblies 12 is shown. The filter assemblies 12 are typically housed in a containment structure 14, represented in FIG. 1 in dashed line form, which may, by way of example, be a concrete vault or other buried tank structure that is generally adapted to receive stormwater runoff (e.g., via an inlet 11) from a stormwater drainage conduit, a parking lot, a street, or other impermeable and/or semi-impermeable surface. The containment structure 14 may include a forebay 13 that includes a storm water settling basin that facilitates settling of particulates and debris from the stormwater. However, the containment structure 14 may not require a settling basin in implementations where the filter assemblies 12 are elevated above the floor 16 of the containment structure. The elimination of the settling basin can allow for placement of additional filter assemblies 12 within a containment structure 14 of the same size footprint by expanding the water treatment zone.

Figure 2:
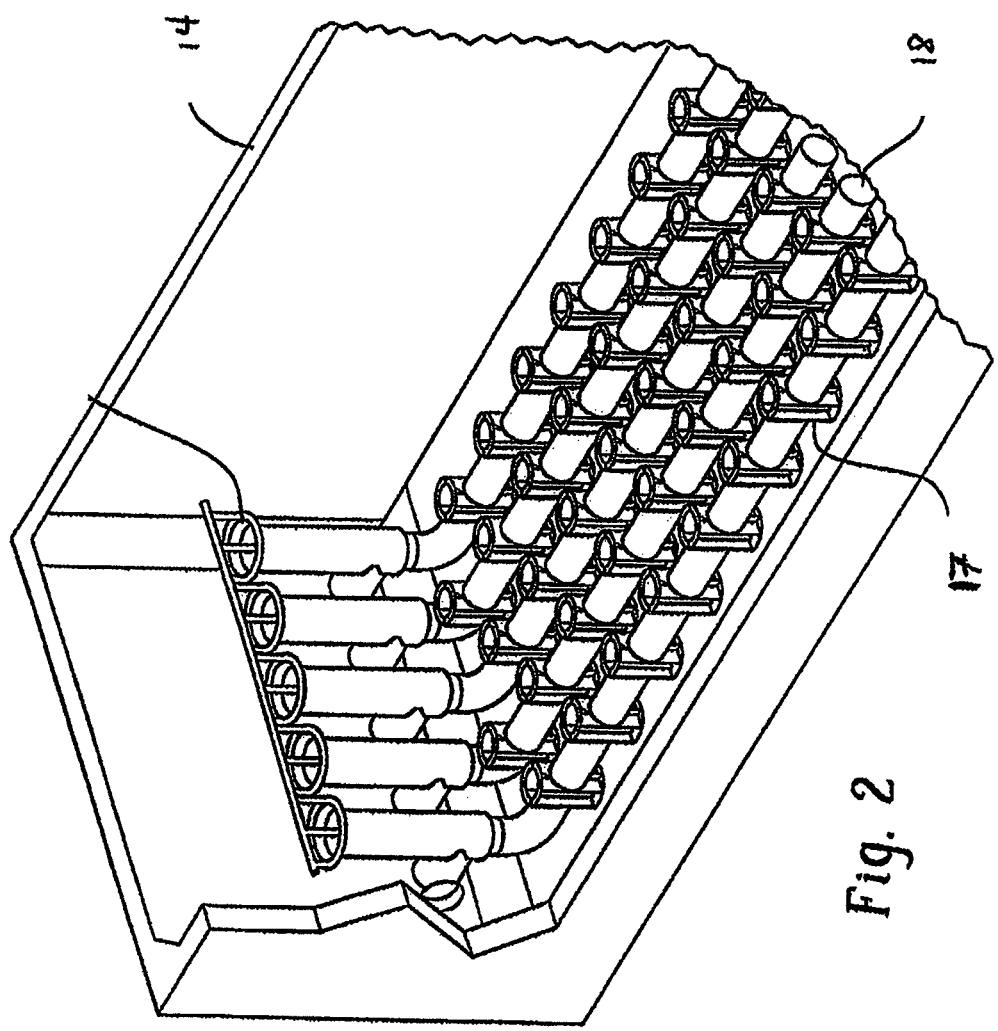
FIG. 2 is a partial perspective view of an alternative filter assembly installation.

A given containment structure 14 may contain a single filter assembly 12, but more typically contains two or more filter assemblies. The internal drainage space of each filter assembly 12 is in fluid communication with a drain manifold or manifolds 18 that may be embedded in the containment structure 14, as shown in FIG. 1. However, in some embodiments, the drain manifolds or flow piping may not be embedded in concrete or the containment structure). The drain manifold 18 may lead to a trough (e.g., a covered or uncovered trough) which is in communication with a common drainage conduit. The clarified stormwater leaving the containment structure 14 may be released through the outlet 15 into a receiving water body, or diverted to an additional treatment device for further purification. In an alternative arrangement, as per FIG. 2, the filter assemblies may be elevated above the bottom surface of the containment structure 14'. Multiple saddle structures 17 support respective drain manifolds/conveyance conduits 18 and each filter could be positioned above a respective saddle member 17 (e.g., as per U.S. Pat. No. 7,638,066).

The filter assembly 12 serves to channel stormwater through a filter medium, and facilitate efficient filtration of the stormwater. Referring to the embodiment of FIGS. 3 and 4, filter assembly 12 is substantially enclosed by a housing formed by a hood 20 and base 30. The hood optionally may include a plurality of voids (not shown) to enhance the regulated surface cleaning of the filter medium. The voids may be arranged in a horizontally-aligned array within the material of the hood, for example higher than but near a lower edge 22 of hood 20.

Hood 20 can be attached to the filter assembly 12 via a cap 24, which may threadingly engage an upward-extending end of an internal perforated tube 26, that extends along a vertical, central axis of the hood 20 or the hood may be attached to the filter assembly by other means. The connection between the cap 24 and the hood 20 may be sealed, for example, through the use of a hood gasket 21 of an appropriate sealing material, such as neoprene rubber. The cap 24 may further include an air valve 23 (e.g., a one way check valve) for allowing air to escape from the filter assembly 12 during a storm event, but preventing the inflow of water through the valve when the filter unit is submerged. In some embodiments the valve 23 may be eliminated and the air simply purges the filter by passing down the tube 44 described below.

The components of the filter assembly 12 are supported by a base 30 (e.g., a circular base with a central opening 31 in the case of the illustrated filter assembly) of water-impermeable material, preferably plastic. This base 30 is seated over a connector 32 that serves as the connection point between the filter assembly 12 and the drain manifold 18 or saddle 17. The connector 32 is in fluid communication with the inner drainage space 34 that is in turn in fluid communication with a filter medium 36 (e.g., granular or pelletized filter media). The filter medium 36 is disposed in an annular space 35 between an internal tube 26 and an external screen and/or filter fabric 28 and extends upward from the base 30 to a sealed annular plate member 31. An outer screen support ring 40 is also provided. Internal of perforated tube 26 is a movable, central, solid-walled drain tube 44 with a float 47 at its top portion. An annular volume 45 defined between the drain tube 44 and the perforated tube 26 forms a fluid path along which fluid may travel to and from a filtered water or backflush reservoir 48 located above and separated from the filter medium 36.

Figure 3:
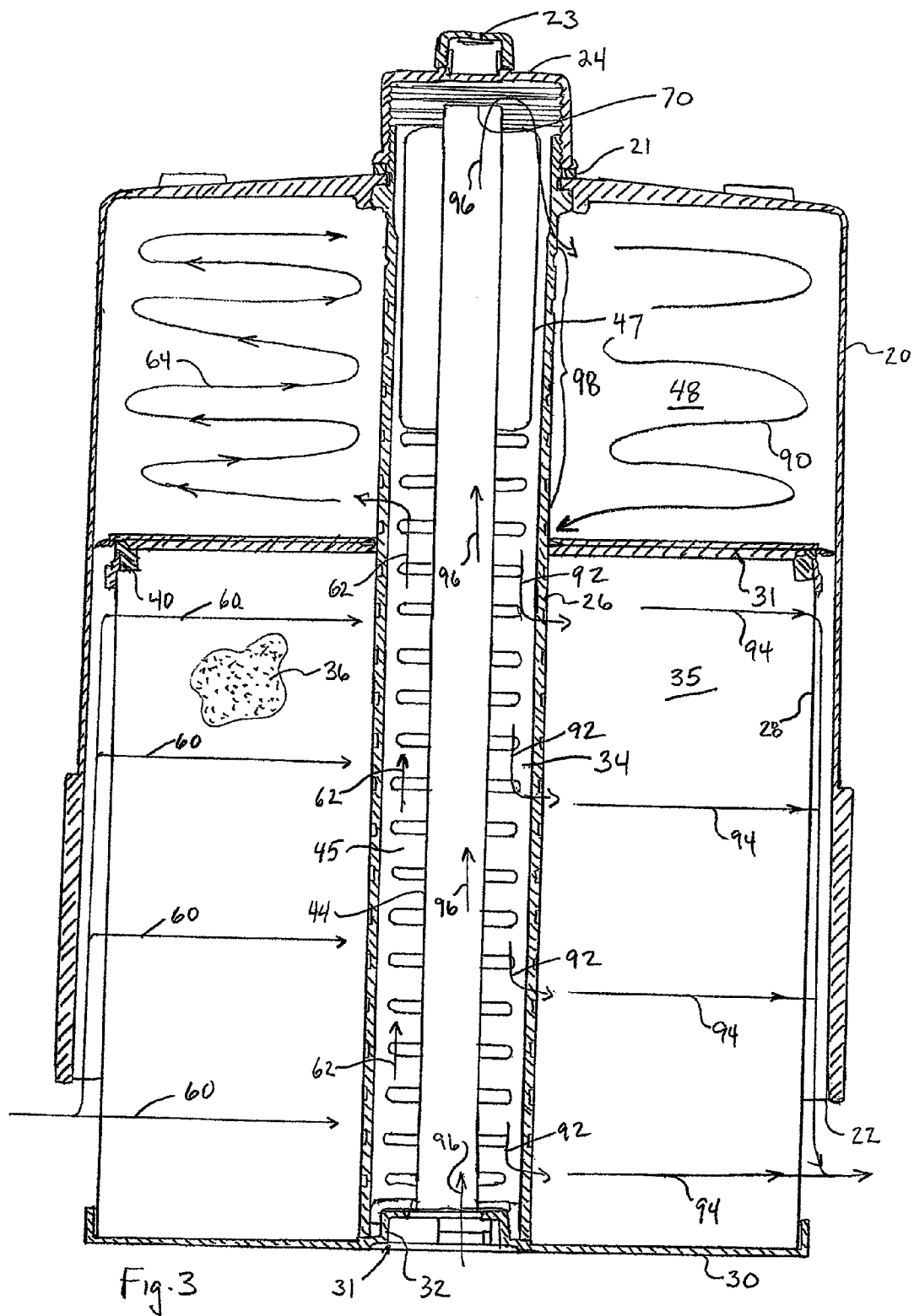
FIG. 3 is a partial cross-section of an embodiment of a filter apparatus with a solid walled, floatable center tube, with the tube in a lowered position during filling and backflush.

The filter assembly 12 generally relies on hydraulic pressure to initially force water through the filter medium 36 and the filter assembly is therefore at least partially submerged in stormwater during normal operation. As shown by the arrows 60, 62 and 64 in the left side of FIG. 3 depicting exemplary initial inflow, stormwater enters the filter assembly 12 from beneath hood 20, infiltrates radially inward through the outer screen 28 and filter medium 36, and travels into the volume 45 located between the drain tube 44 and the perforated tube 26. Filtration occurs as the water is strained through, and comes into contact with, the filter medium 36 during this initial flow, but outflow from the cartridge is prevented by the engagement between the lower end of tube 44 and the connector 32 as shown. Once in the volume 45, the filtered stormwater travels vertically upward and will then flow into the reservoir 48 located above the filter medium 36.

Figure 4:
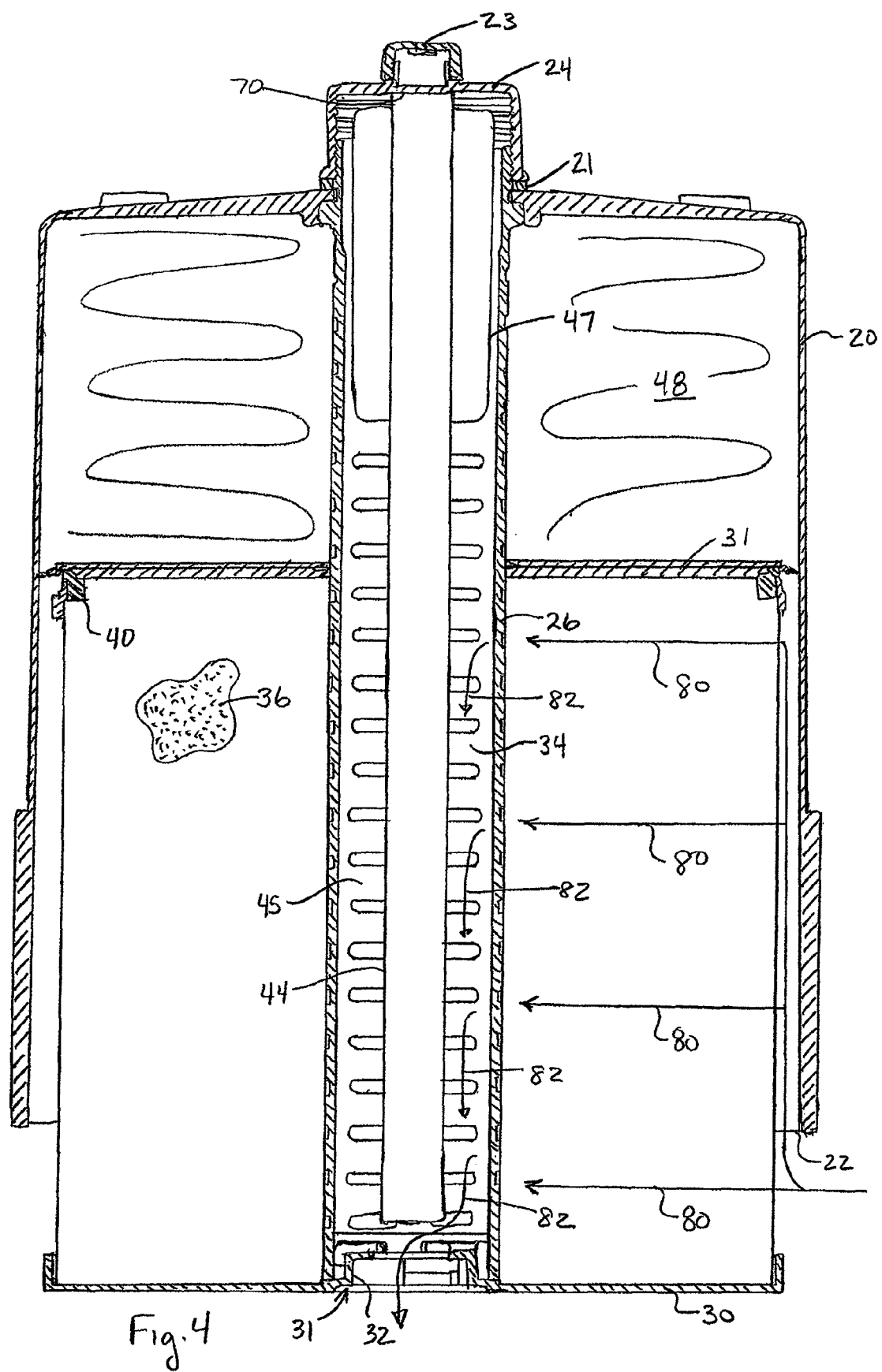
FIG. 4 is a partial cross-section of the embodiment of FIG. 3 with the tube in a raised position during filtration flow through the filter assembly.

As the reservoir 48 fills and the water level in space 45 similarly rises upward toward the location of the float 47, the float eventually causes the tube 44 to pop upward into the position shown in FIG. 4. The tube 44 is preferably positioned and configured such that this floating action of the center tube occurs before the water rises high enough to flow down into the top opening 70 of the tube 44, but variations in which some flow down the tube 44 occurs prior to upward movement of the tube 44 are contemplated. Once the tube 44 shifts upward, continued flow 80 through the media enters the space 45 and travels downward into the drain outlet of the cartridge (per arrows 82). The falling water then induces a reduced pressure condition that pulls water through the filter medium 36. As filtration continues and water passes through the cartridge the fluid reservoir 48 remains full or substantially full of filtered water. As a storm event begins to subside and water level outside the housing starts to drop, the water level within the housing is not affected and a standing column of water within the housing, including the reservoir 48, is maintained, and the reduced pressure condition or siphon effect continues to draw stormwater through the filter assembly 12. When the water surface elevation outside the hood 20 drops low enough such that air is able to enter the housing (e.g., below the level of the lower edge 22 of the hood), the pressure differential between the outside and the inside of the hood 20 then causes outside air to be drawn beneath the hood in seeking to equalize the pressure.

As air flows into the housing, it tends to migrate into the upper portion of the space 45 around the upper end of the float tube. Once the presence of air in the housing is sufficient to permit the float tube to drop back to the lowered position, the reduced pressure condition or siphon effect is completely broken. Filtered stormwater that has accumulated in the reservoir 48 begins a journey back through the filter assembly 12. In particular, per the right side of FIG. 3 as shown by flow arrows 90, 92 and 94 the filtered stormwater travels from the reservoir 48, vertically down the path between the drain tube 44 and the perforated tube 26, radially outwardly through the filter media 36 and beneath the hood 20. This backflush of filtered stormwater can serve to loosen and remove particles trapped in the filter media 36, thereby increasing the longevity of the filter media. The passage in the tube 44 thus allows air to enter the cartridge from the drain manifold 18, per air flow arrows 96, enhancing the rate of backflow of water out of the filter.

Figure 5:
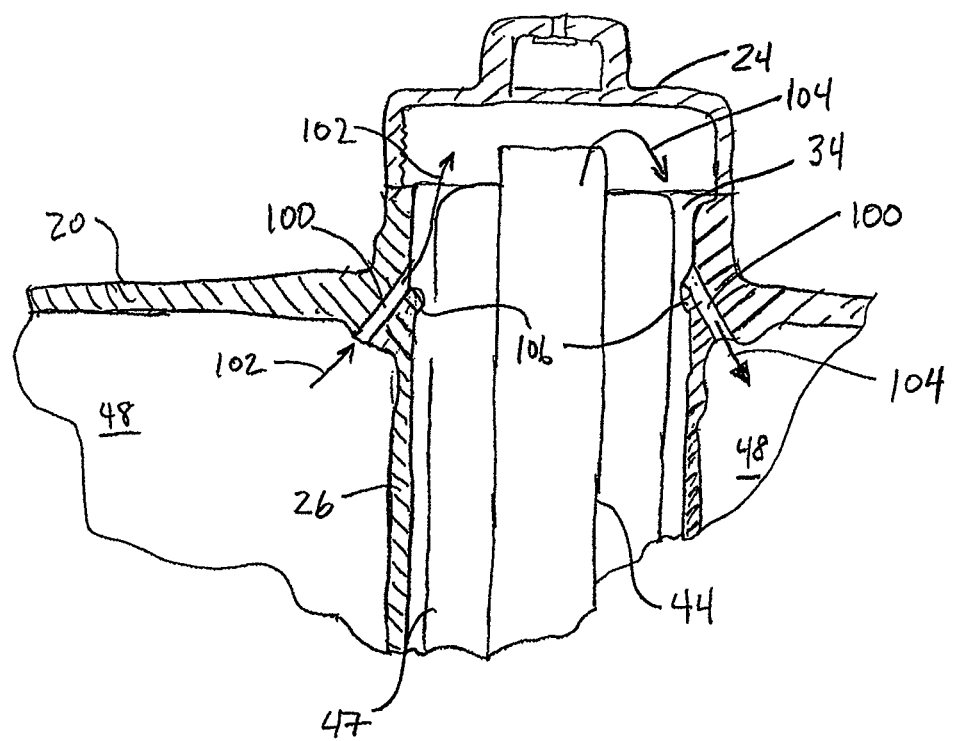
FIG. 5 is a partial cross-section of one embodiment of an air flow arrangement for the fluid reservoir.
Figure 6:
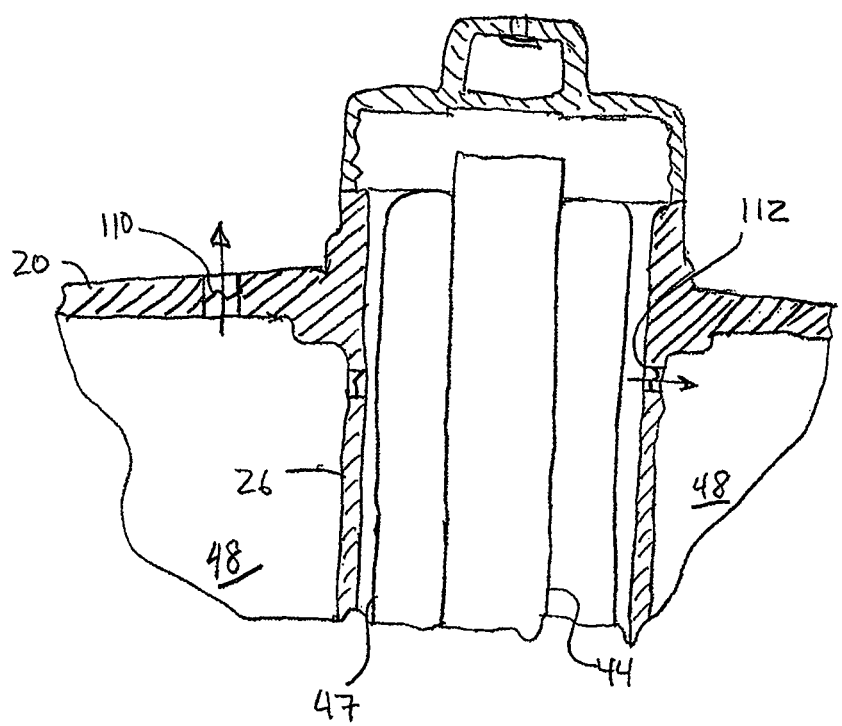
FIG. 6 is a partial cross-section of another embodiment of an air flow arrangement for the fluid reservoir.

In one implementation, an upper portion 98 (FIG. 3) of the tube 26 could be made without perforations to focus the inflow of air into the hood under the hood edge into space 45. Referring now to the partial view of FIG. 5, in one embodiment, the center tube 26, hood 20 or both could include one or more upwardly directed air flow passages 100 from the reservoir 48 to the upper end of the drainage space 34. These passages 100 will permit air flow to exit the reservoir 48 per flow arrows 102 on the left side of FIG. 5 as the reservoir fills from below with filtered water (e.g., during a cartridge filling operation). Conversely, the passages 100 will permit air that flows upward through the tube 44 to enter the upper portion of the reservoir 48 as shown by arrows 104 on the right side of FIG. 5 as filtered water exits the reservoir at the lower portion of the reservoir and backwashes through the filter. Moreover, the passages 100 may be configured with deflecting portions 106 at the lower edges thereof such that bubbles of air moving upward in the drainage space 34 (e.g. as air enters the filter housing and passes through the filter medium due to low water level outside the hood) tend to be pushed away from the passages 100. In this manner the bulk of the incoming air will be focused in the immediate area around the float 47, rather than moving into the reservoir 48, causing the float tube to drop sooner and providing a greater volume of water for backflush. Referring to FIG. 6, in another embodiment, the reservoir 48 itself may include an associated one-way air outlet valve 110 that permits air to purge from the reservoir during reservoir fill as shown in the left side of FIG. 6. During a backwash operation, a one-way air valve 112 permits air to flow from the drainage space into the upper portion of the reservoir 48 as shown in the right side of FIG. 6 as filtered water leaves the lower portion of the reservoir 48. Other air flow variations are possible.

The size of the reservoir 48 may be selected to provide a back flush of stormwater of a preselected volume. In one implementation, the size of the reservoir 48 is set by the use of standard component sizes. For example, where non-backflush filter cartridges (such as those described in U.S. Pat. No. 6,027,639 or PCT Patent Publication No. WO/2008/140919) are available in two different standard sizes (e.g., and 18 inch tall size and a 27 inch tall size), an improved backflush cartridge can be achieved by utilizing the hood 20 and perforated tube 26 from the standard 27 inch high cartridge in combination with the filter media screen and space of the standard 18 inch high cartridge, with the addition of the plate 31 and the floating solid wall center tube 44. Such an implementation provides a manufacturing methodology for the three different filter cartridges (i.e., standard 18 inch, standard 27 inch and 27 inch backflush) with reduced new part requirements. Specifically, to manufacture a standard 18 inch cartridge the hood, tube and filter media screen for the 18 inch are used, to manufacture a 27 inch standard cartridge the hood, tube and filter media screen for the 27 inch are used, and to manufacture the 27 inch backflush the hood and tube for the 27 inch are used in combination with the filter media screen for the 18 inch.

While the filters above are described primarily in connection with housings in which water enters from beneath a lower edge and then flows radially through an annular media space, variations are possible. For example filters in which water enters through the bottom of the cartridge are possible. Additionally, a variety of types of filter mediums could be located within cartridges, such as fabric type filters, mesh filters, media based filters and combinations of the same, as well as configuration variations such as spiral wound filters with various flow patterns.

It is to be clearly understood that the above description is intended by way of illustration and example only and is not intended to be taken by way of limitation, and that changes and modifications are possible. Accordingly, other embodiments are contemplated and modifications and changes could be made without departing from the scope of this application as expressed by any claims now included or hereafter added.

What is claimed is:

1. A filter cartridge for removing pollutants from stormwater, comprising:
   a housing having a water inlet and a filtered water outlet;
   a filter medium disposed along a flow path between the water inlet and the filtered water outlet;
   a drainage space that forms at least part of the flow path and that is disposed between a downstream side of the filter medium and the filtered water outlet;
   a solid wall float tube disposed in the drainage space and having an open lower end and open upper end to allow air to pass into, upward through and out of the tube into the drainage space, the solid wall float tube movable between a lowered position that inhibits or substantially restricts filtered water at the bottom of the drainage space from passing to the filtered water outlet and a raised position that permits free flow of filtered water to the filtered water outlet;
   a fluid reservoir in fluid communication with the drainage space and disposed within the housing and above the filter medium for collecting filtered water as water level in the housing rises while the solid wall float tube is in the lowered position;
   wherein, as the housing fills, water level in the housing rises to cause the solid wall float tube to move to the raised position and a negative pressure can be established in the housing that draws fluid through the filter medium;
   wherein, as water level outside the filter cartridge drops, air enters the housing via the water inlet and causes the solid wall float tube to drop to the lowered position, and filtered water in the fluid reservoir backflows through the filter medium and out of the housing through the water inlet while air enters the housing by passing upward through the solid wall float tube so as to enhance rate of backflow while the solid wall float tube is in the lowered position.

2. The filter cartridge of claim 1 wherein the drainage space is centrally located within the housing, the filtered water outlet is at the bottom of the drainage space, and the drainage space is defined at least in part by a tube that surrounds the solid wall float tube and which is perforated along at least a lower section thereof.

3. The filter cartridge of claim 2 wherein an upper portion of the tube is not perforated.

4. The filter cartridge of claim 1 wherein the filter medium comprises one or more of a granular filter media, a pelletized filter media, a filter fabric or a filter mesh.

5. The filter cartridge of claim 1 wherein the fluid reservoir includes an associated check valve for purging air from the fluid reservoir as it fills with filtered water.

6. The filter cartridge of claim 1 wherein at least one upwardly directed air flow passage is provided internal of the cartridge from an upper portion of the fluid reservoir to an upper portion of the drainage space.

7. The filter cartridge of claim 6 wherein a deflecting structure is located below the air flow passage in the drainage space.

8. A stormwater treatment system including a plurality of filter cartridges; each filter cartridge comprising housing having a water inlet and a filtered water outlet; a filter medium disposed along a flow path between the water inlet and the filtered water outlet; a drainage space that forms at least part of the flow path and that is disposed between a downstream side of the filter medium and the filtered water outlet; a solid wall float tube disposed in the drainage space and having an open lower end and open upper end to allow air to pass into, upward through and out of the tube into the drainage space, the solid wall float tube movable between a lowered position that inhibits or substantially restricts filtered water at the bottom of the drainage space from passing to the filtered water outlet and a raised position that permits free flow of filtered water to the filtered water outlet; a fluid reservoir in fluid communication with the drainage space and disposed within the housing and above the filter medium for collecting filtered water as water level in the housing rises while the solid wall float tube is in the lowered position; wherein, as the housing fills, water level in the housing rises to cause the solid wall float tube to move to the raised position and a negative pressure can be established in the housing that draws fluid through the filter medium; wherein, as water level outside the filter cartridge drops, air enters the housing via the water inlet and causes the solid wall float tube to drop to the lowered position, and filtered water in the fluid reservoir backflows through the filter medium and out of the housing through the water inlet while air enters the housing by passing upward through the solid wall float tube so as to enhance rate of backflow while the solid wall float tube is in the lowered position, the system including:
   a containment structure including an inlet and at least one drain manifold, each filter cartridge within the containment structure and having its outlet connected to deliver filtered stormwater to the drain manifold.

9. A stormwater filter assembly, comprising:
   a housing including an inlet and an outlet;
   an inner float tube within the housing and having a lower end associated with the outlet, the float tube movable between a lowered position that inhibits or substantially restricts filtered water from passing to the outlet and a raised position that permits flow of filtered water to the outlet, the inner float tube having an air flow passage therein from its lower end to its upper end to allow air to pass into, upward through and out of the inner float tube;
   an outer tube disposed about the inner float tube defining a flow space therebetween for receiving filtered stormwater;
   a filter medium disposed between the inlet and the outer tube through which stormwater travels during a filtering operation, the inner float tube extends upward above a height of the filter medium and the outer tube extends upward above the height of the filter medium;
   a fluid reservoir located above the filter media for collecting filtered stormwater as water level in the housing rises while the inner float tube is in the lowered position;
   wherein during a stormwater filtration event water level in the housing rises to cause the inner float tube to move to the raised position and a negative pressure is established in the housing that draws fluid through the filter medium;
   wherein, as water level outside the filter cartridge drops, air enters the housing and disrupts the reduced pressure condition and causes the inner float tube to drop to the lowered position and filtered water in the fluid reservoir backflows through the filter medium and out of the housing while air enters the housing by passing upward through the inner float tube along the air flow passage so as to enhance rate of backflow while the inner float tube is in the lowered position.

10. The filter assembly of claim 9 wherein the inner float tube and outer tube are centrally located within the housing, the filtered water outlet is at the bottom of the housing, the outer tube includes a plurality of openings along at least a lower section thereof.

11. The filter assembly of claim 10 wherein an upper portion of the outer tube is not perforated.

12. The filter assembly of claim 9 wherein the filter medium comprises one or more of a granular filter media, a pelletized filter media, a filter fabric or a filter mesh.

13. The filter assembly of claim 9 wherein the fluid reservoir includes an associated check valve for purging air from the fluid reservoir as it fills with filtered water.

14. The filter assembly of claim 9 wherein at least one upwardly directed air flow passage is provided internal of the cartridge from an upper portion of the fluid reservoir to an upper portion of the flow space.

15. The filter assembly of claim 14 wherein a deflecting structure is located below the air flow passage in the flow space.

16. A stormwater treatment system including a plurality of filter assemblies, each filter assembly comprising: a housing including an inlet and an outlet; an inner float tube within the housing and having a lower end associated with the outlet, the float tube movable between a lowered position that inhibits or substantially restricts filtered water from passing to the outlet and a raised position that permits flow of filtered water to the outlet, the inner float tube having an air flow passage therein from its lower end to its upper end to allow air to pass into, upward, through and out of the inner float tube; an outer tube disposed about the inner float tube defining a flow space therebetween for receiving filtered stormwater; a filter medium disposed between the inlet and the outer tube through which stormwater travels during a filtering operation, the inner float tube extends upward above a height of the filter medium and the outer tube extends upward above the height of the filter medium; a fluid reservoir located above the filter media for collecting filtered stormwater as water level in the housing rises while the inner float tube is in the lowered position; wherein during a stormwater filtration event water level in the housing rises to cause the inner float tube to move to the raised position and a negative pressure is established in the housing that draws fluid through the filter medium; wherein, as water level outside the filter cartridge drops, air enters the housing and disrupts the reduced pressure condition and causes the inner float tube to drop to the lowered position and filtered water in the fluid reservoir backflows through the filter medium and out of the housing while air enters the housing by passing upward through the inner float tube along the flow passage so as to enhance rate of backflow while the inner float tube is in the lowered position, the system including:
a containment structure including an inlet and at least one drain manifold, each filter assembly within the containment structure and having its outlet connected to deliver filtered stormwater to the drain manifold.

17. A method of filtering stormwater to remove contaminants, comprising:
flowing stormwater into a filter unit;
purging air from the filter housing as the filter unit fills with stormwater;
providing a float tube within the unit in a lowered position that inhibits filtered stormwater from exiting through an outlet of the filter unit, the float tube having an air flow passage therein from its lower end to its upper end to allow air to pass upward through the float tube;
filling an upper fluid reservoir of the filter unit with filtered stormwater;
moving the float tube to a raised position that permits filtered stormwater to exit the outlet and creating a reduced pressure condition that draws stormwater through the filter unit;
as water level around the filter housing drops:
air enters the filter unit and disrupts the reduced pressure condition and causes the float tube to drop back to the lowered position; and
filtered water in the fluid reservoir backflows through the filter unit while air enters the filter unit by passing upward through the float tube so as to enhance rate of backflow while the float tube is in the lowered position.

18. The filtration cartridge of claim 1 wherein when the solid wall float tube is in the lowered position the open upper end of the solid wall float tube is located higher than the fluid reservoir.

* * * * *